US012786864B2

(12) United States Patent
Shen et al.

(10) Patent No.: US 12,786,864 B2
(45) Date of Patent: Nov. 3, 2026

(54) CLOSED ACCESS GROUP CELL SEARCH AND RESELECTION

(71) Applicant: QUALCOMM Incorporated, San Diego, CA (US)

(72) Inventors: Xinning Shen, San Diego, CA (US); Osama Lotfallah, San Diego, CA (US); Qin Xue Frantti, San Diego, CA (US); Sunitha Sundaram, San Diego, CA (US); Sivasubramanian Ramalingam, Hyderabad (IN); Yi Ren, Shanghai (CN); Flora Pui San Chan, San Diego, CA (US); Cogol Tina, Mission Viejo, CA (US); Jun Deng, Shanghai (CN); Mudita Saiyadh, San Diego, CA (US); Harshpreet Singh, New Delhi (IN)

(73) Assignee: QUALCOMM Incorproated, San Diego, CA (US)

(*) Notice: Subject to any disclaimer, the term of this patent is extended or adjusted under 35 U.S.C. 154(b) by 268 days.

(21) Appl. No.: 18/700,119

(22) PCT Filed: Dec. 17, 2021

(86) PCT No.: PCT/CN2021/139066

§ 371 (c)(1),
(2) Date: Apr. 10, 2024

(87) PCT Pub. No.: WO2023/108599

PCT Pub. Date: Jun. 22, 2023

(65) Prior Publication Data

US 2024/0422661 A1 Dec. 19, 2024

(51) Int. Cl.

*H04W 48/18* (2009.01)
*H04W 48/16* (2009.01)
*H04W 88/06* (2009.01)

(52) U.S. Cl.

CPC .......... *H04W 48/18* (2013.01); *H04W 48/16* (2013.01); *H04W 88/06* (2013.01)

(58) Field of Classification Search

CPC ..... H04W 48/18; H04W 48/16; H04W 88/06; H04W 24/08; H04W 48/02

(Continued)

(56) References Cited

U.S. PATENT DOCUMENTS

2014/0248876 A1* 9/2014 Yang ................ H04W 36/0061 455/436
2014/0287753 A1* 9/2014 Schulist ................ H04W 48/18 455/436

(Continued)

FOREIGN PATENT DOCUMENTS

WO WO-2021210457 A1 10/2021

OTHER PUBLICATIONS

International Search Report and Written Opinion—PCT/CN2021/139066—ISA/EPO—Jun. 29, 2022.

(Continued)

*Primary Examiner* — Juan A Torres
(74) *Attorney, Agent, or Firm* — Harrity & Harrity, LLP

(57) ABSTRACT

Various aspects of the present disclosure generally relate to wireless communication. In some aspects, a user equipment (UE) may perform, while camped on a cell of a first radio access technology (RAT), a search for closed access group (CAG) cells of a second RAT different from the first RAT. The UE may populate a database based at least in part on the search, wherein populating the database includes associating the cell of the first RAT with one or more of the CAG cells of the second RAT. The UE may perform a reselection process from the cell of the first RAT to a first CAG cell of the second RAT, of the one or more CAG cells of the second RAT. Numerous other aspects are described.

30 Claims, 7 Drawing Sheets

(58) Field of Classification Search
USPC .............. 455/434, 422.1, 32.1, 515; 370/328
See application file for complete search history.

(56) References Cited

U.S. PATENT DOCUMENTS

| | | | | |
|---|---|---|---|---|
| 2014/0321447 | A1* | 10/2014 | Ozturk | H04W 60/00 370/338 |
| 2014/0378140 | A1* | 12/2014 | Gopal | H04W 48/16 455/437 |
| 2015/0072685 | A1* | 3/2015 | Chuang | H04W 48/18 455/436 |
| 2015/0219750 | A1* | 8/2015 | Xiao | G01S 5/14 342/451 |
| 2016/0037388 | A1* | 2/2016 | Yang | H04W 36/302 370/332 |
| 2019/0069210 | A1* | 2/2019 | Lee | H04W 76/30 |
| 2021/0321307 | A1* | 10/2021 | Shih | H04W 48/18 |
| 2021/0329543 | A1 | 10/2021 | Jin et al. | |
| 2021/0400552 | A1* | 12/2021 | Shih | H04W 48/16 |
| 2022/0322182 | A1* | 10/2022 | Lee | H04W 76/27 |
| 2023/0135827 | A1* | 5/2023 | Kim | H04W 48/12 370/329 |

OTHER PUBLICATIONS

Qualcomm Incorporated: “Clarifications to Storage of CAG Information List”, 3GPP TSG-CT WG1 Meeting #126-e, C1-205947, Electronic meeting, Oct. 15-23, 2020, The whole document.
CMCC: “Consideration on Public Network Integrated Npn”, 3GPP TSG-RAN WG2 #107, R2-1909471, 3rd Generation Partnership Project, Mobile Competence Centre, 650, Route Des Lucioles, F-06921, Sophia-Antipolis Cedex, France, vol. RAN WG2, No. Prague, Czech Republic, Aug. 26, 2019-Aug. 30, 2019, Aug. 16, 2019, 11 Pages, XP051767270, paragraph [2.3.4]—paragraph [2.3.6].
Lenovo, et al., “Open Issues in the Specification of NPN in TS 38.304”, 3GPP TSG RAN WG2 Meeting #109 electronic, R2-2001174, 3rd Generation Partnership Project, Mobile Competence Centre, 650, Route Des Lucioles, F-06921, Sophia-Antipolis Cedex, France, vol. RAN WG2, No. electronic, Feb. 24, 2020-Mar. 6, 2020, Feb. 13, 2020, 3 Pages, XP052356328, paragraph [02.2].
Lenovo, et al., “Remaining Open Issues in the Specification of NPN”, 3GPP TSG RAN WG2 Meeting #110 electronic, R2-2004603, 3rd Generation Partnership Project, Mobile Competence Centre, 650, Route Des Lucioles, F-06921, Sophia-Antipolis Cedex, France, vol. RAN WG2, No. electronic, Jun. 1, 2020-Jun. 12, 2020, May 21, 2020, XP052357664, 3 Pages.
Supplementary European Search Report—EP21967733—Search Authority—Berlin—Aug. 5, 2025.

* cited by examiner

CLOSED ACCESS GROUP CELL SEARCH AND RESELECTION

CROSS-REFERENCE TO RELATED APPLICATION

This Patent Application is a 371 national stage of PCT Application No. PCT/CN2021/139066, filed on Dec. 17, 2021, entitled "CLOSED ACCESS GROUP CELL SEARCH AND RESELECTION," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for closed access group cell search and reselection.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to an apparatus for wireless communication at a UE. The apparatus may include a memory and one or more coupled to the memory. The one or more processors may be configured to perform, while camped on a cell of a first radio access technology (RAT), a search for closed access group (CAG) cells of a second RAT different from the first RAT. The one or more processors may be configured to populate a database based at least in part on the search, wherein populating the database includes associating the cell of the first RAT with one or more of the CAG cells of the second RAT. The one or more processors may be configured to perform a reselection process from the cell of the first RAT to a first CAG cell of the second RAT, of the one or more CAG cells of the second RAT.

Some aspects described herein relate to a method of wireless communication performed by a UE. The method may include performing, while camped on a cell of a RAT, a search for CAG cells of a second RAT different from the first RAT. The method may include populating a database based at least in part on the search, wherein populating the database includes associating the cell of the first RAT with one or more of the CAG cells of the second RAT. The method may include performing a reselection process from the cell of the first RAT to a first CAG cell of the second RAT, of the one or more CAG cells of the second RAT.

Some aspects described herein relate to a non-transitory computer-readable medium that stores a set of instructions for wireless communication by a UE. The set of instructions, when executed by one or more processors of the UE, may cause the UE to perform, while camped on a cell of a first RAT, a search for CAG cells of a second RAT different from the first RAT. The set of instructions, when executed by one or more processors of the UE, may cause the UE to populate a database based at least in part on the search, wherein populating the database includes associating the cell of the first RAT with one or more of the CAG cells of the second RAT. The set of instructions, when executed by one or more processors of the UE, may cause the UE to perform a reselection process from the cell of the first RAT to a first CAG cell of the second RAT, of the one or more CAG cells of the second RAT.

Some aspects described herein relate to an apparatus for wireless communication. The apparatus may include means for performing, while camped on a cell of a first RAT, a search for CAG cells of a second RAT different from the first RAT. The apparatus may include means for populating a database based at least in part on the search, wherein populating the database includes associating the cell of the first RAT with one or more of the CAG cells of the second RAT. The apparatus may include means for performing a reselection process from the cell of the first RAT to a first CAG cell of the second RAT, of the one or more CAG cells of the second RAT.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) RAT, aspects of the present disclosure can be applied to other RATs, such as a 3G RAT, a 4G RAT, and/or a RAT subsequent to 5G (e.g., 6G).

Figure 1:
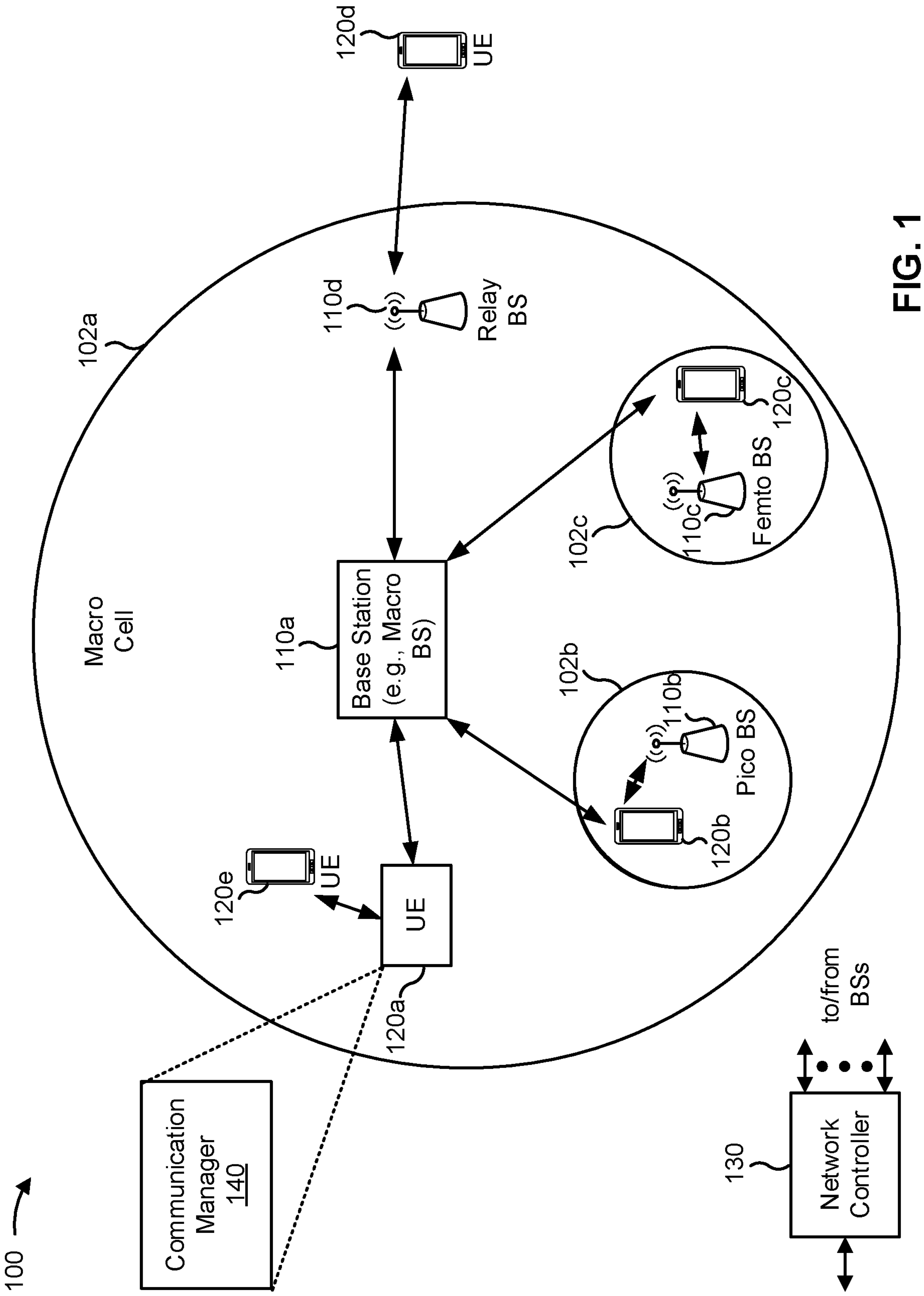
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110*a*, a BS 110*b*, a BS 110*c*, and a BS 110*d*), a UE 120 or multiple UEs 120 (shown as a UE 120*a*, a UE 120*b*, a UE 120*c*, a UE 120*d*, and a UE 120*e*), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110*a* may be a macro base station for a macro cell 102*a*, the BS 110*b* may be a pico base station for a pico cell 102*b*, and the BS 110*c* may be a femto base station for a femto cell 102*c*. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110*d* (e.g., a relay base station) may communicate with the BS 110*a* (e.g., a macro base station) and the UE 120*d* in order to facilitate communication between the BS 110*a* and the UE 120*d*. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHZ), and FR5 (114.25 GHZ-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHZ, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may perform, while camped on a cell of a first RAT, a search for CAG cells of a second RAT different from the first RAT; populate a database based at least in part on the search, wherein populating the database includes associating the cell of the first RAT with one or more of the CAG cells of the second RAT; and perform a reselection process from the cell of the first RAT to a first CAG cell of the second RAT, of the one or more CAG cells of the second RAT. Additionally, or alternatively, the communication manager 140 may perform one or more other operations described herein.

As indicated above, FIG. 1 is provided as an example. Other examples may differ from what is described with regard to FIG. 1.

Figure 2:
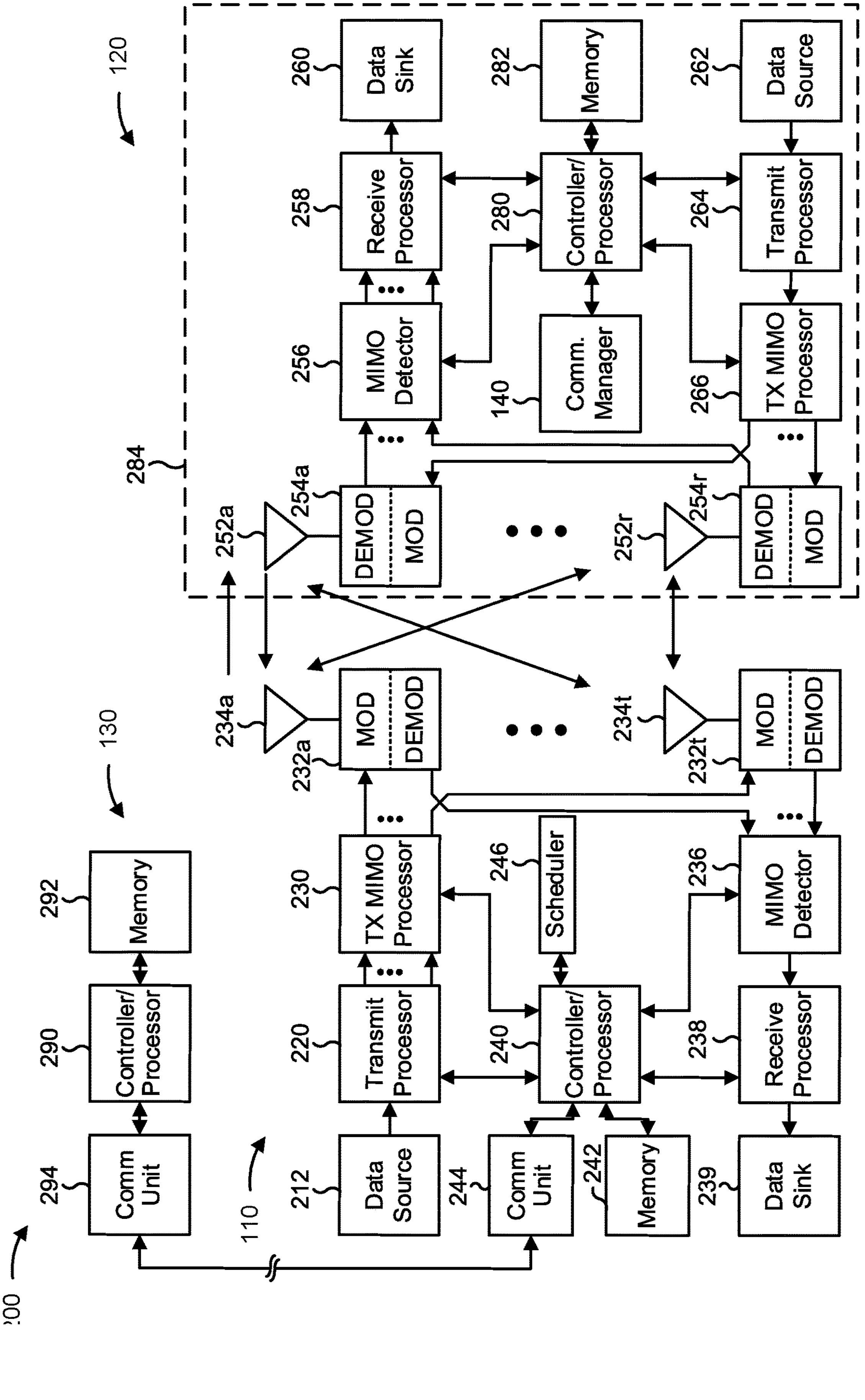
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234*a* through 234*t*, such as T antennas (T≥1). The UE 120 may be equipped with a set of antennas 252*a* through 252*r*, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the base station 110 and/or other base stations 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples.

An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-7).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-7).

The controller/processor 240 of the base station 110, the controller/processor 280 of the UE 120, and/or any other component(s) of FIG. 2 may perform one or more techniques associated with closed access group cell search and reselection, as described in more detail elsewhere herein. For example, the controller/processor 240 of the base station 110, the controller/processor 280 of the UE 120, and/or any other component(s) of FIG. 2 may perform or direct operations of, for example, process 600 of FIG. 6, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, and/or other processes as described herein. In some examples, executing instructions may include running the instructions, converting the instructions, compiling the instructions, and/or interpreting the instructions, among other examples.

In some aspects, the UE includes means for performing, while camped on a cell of a first RAT, a search for CAG cells of a second RAT different from the first RAT; means for populating a database based at least in part on the search, wherein populating the database includes associating the cell of the first RAT with one or more of the CAG cells of the second RAT; and/or means for performing a reselection process from the cell of the first RAT to a first CAG cell of the second RAT, of the one or more CAG cells of the second RAT. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
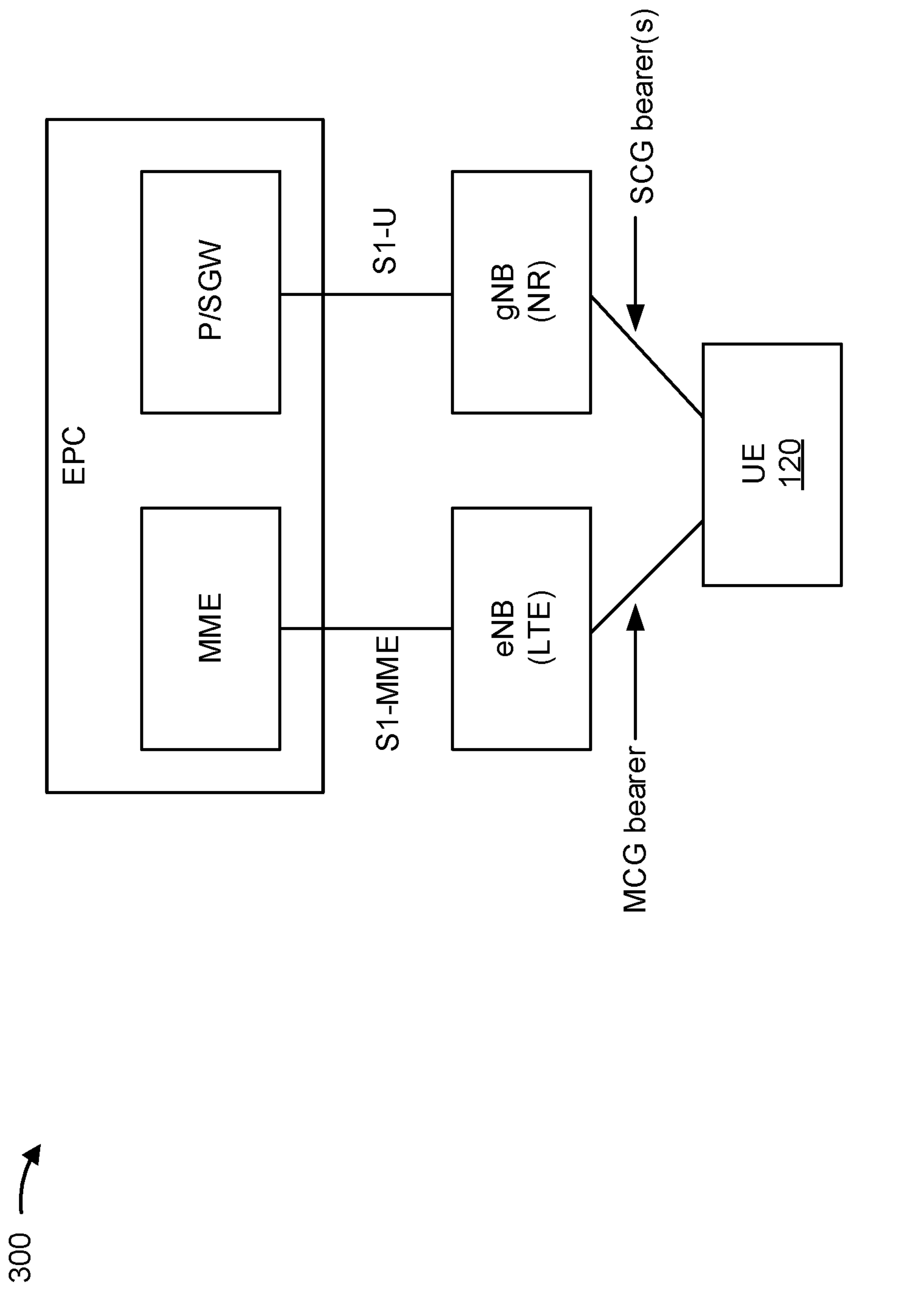
FIG. 3 is a diagram illustrating an example of dual connectivity, in accordance with the present disclosure.

FIG. 3 is a diagram illustrating an example 300 of dual connectivity, in accordance with the present disclosure.

According to some aspects, a UE 120 may operate in a dual connectivity mode. That is, the UE 120 may be capable of communicating using more than one RAT, or may be capable of maintaining multiple connections using a given RAT, and accordingly may perform cell reselection processes to switch between cells according to operating conditions or the like. The example shown in FIG. 3 is for an Evolved Universal Mobile Telecommunications System Terrestrial Radio Access (E-UTRA)-NR dual connectivity (ENDC) mode. In the ENDC mode, a UE 120 communicates using an LTE RAT on a master cell group (MCG), and the UE 120 communicates using an NR RAT on a secondary cell group (SCG). However, aspects described herein may apply to an ENDC mode (e.g., where the MCG is associated with an LTE RAT and the SCG is associated with an NR RAT), an NR-E-UTRA dual connectivity (NEDC) mode (e.g., where the MCG is associated with an NR RAT and the SCG is associated with an LTE RAT), an NR dual connectivity (NRDC) mode (e.g., where the MCG is associated with an NR RAT and the SCG is also associated with the NR RAT), or another dual connectivity mode (e.g., (e.g., where the MCG is associated with a first RAT and the SCG is associated with one of the first RAT or a second RAT). The ENDC mode is sometimes referred to as an NR or 5G non-standalone (NSA) mode. Thus, as used herein, “dual connectivity mode” may refer to an ENDC mode, an NEDC mode, an NRDC mode, and/or another type of dual connectivity mode.

As shown in FIG. 3, a UE 120 may communicate with both an eNB (e.g., a 4G base station 110) and a gNB (e.g., a 5G base station 110), and the eNB and the gNB may communicate (e.g., directly or indirectly) with a 4G/LTE core network, shown as an evolved packet core (EPC) that includes a mobility management entity (MME), a packet data network gateway (PGW), a serving gateway (SGW), and/or other devices. In FIG. 3, the PGW and the SGW are shown collectively as P/SGW. In some aspects, the eNB and the gNB may be co-located at the same base station 110. In some aspects, the eNB and the gNB may be included in different base stations 110 (e.g., may not be co-located).

As further shown in FIG. 3, in some aspects, a wireless network that permits operation in a 5G NSA mode may permit such operations using a master cell group (MCG) for a first RAT (e.g., an LTE RAT or a 4G RAT) and a secondary cell group (SCG) for a second RAT (e.g., an NR RAT or a 5G RAT). In this case, the UE 120 may communicate with the eNB via the MCG, and may communicate with the gNB via the SCG. In some aspects, the MCG may anchor a network connection between the UE 120 and the 4G/LTE core network (e.g., for mobility, coverage, and/or control plane information), and the SCG may be added as additional carriers to increase throughput (e.g., for data traffic and/or user plane information). In some aspects, the gNB and the eNB may not transfer user plane information between one another. In some aspects, a UE 120 operating in a dual connectivity mode may be concurrently connected with an LTE base station 110 (e.g., an eNB) and an NR base station 110 (e.g., a gNB) (e.g., in the case of ENDC or NEDC), or may be concurrently connected with one or more base stations 110 that use the same RAT (e.g., in the case of NRDC). In some aspects, the MCG may be associated with a first frequency band (e.g., a sub-6 GHz band and/or an FR1 band) and the SCG may be associated with a second frequency band (e.g., a millimeter wave band and/or an FR2 band).

The UE 120 may communicate via the MCG and the SCG using one or more radio bearers (e.g., data radio bearers (DRBs) and/or signaling radio bearers (SRBs)). For example, the UE 120 may transmit or receive data via the MCG and/or the SCG using one or more DRBs. Similarly, the UE 120 may transmit or receive control information (e.g., radio resource control (RRC) information and/or measurement reports) using one or more SRBs. In some aspects, a radio bearer may be dedicated to a specific cell group (e.g., a radio bearer may be an MCG bearer or an SCG bearer). In some aspects, a radio bearer may be a split radio bearer. A split radio bearer may be split in the uplink and/or in the downlink. For example, a DRB may be split on the downlink (e.g., the UE 120 may receive downlink information for the MCG or the SCG in the DRB) but not on the uplink (e.g., the uplink may be non-split with a primary path to the MCG or the SCG, such that the UE 120 transmits in the uplink only on the primary path). In some aspects, a DRB may be split on the uplink with a primary path to the MCG or the SCG. A DRB that is split in the uplink may transmit data using the primary path until a size of an uplink transmit buffer satisfies an uplink data split threshold. If the uplink transmit buffer satisfies the uplink data split threshold, the UE 120 may transmit data to the MCG or the SCG using the DRB.

As indicated above, FIG. 3 is provided as an example. Other examples may differ from what is described with respect to FIG. 3.

Figure 4:
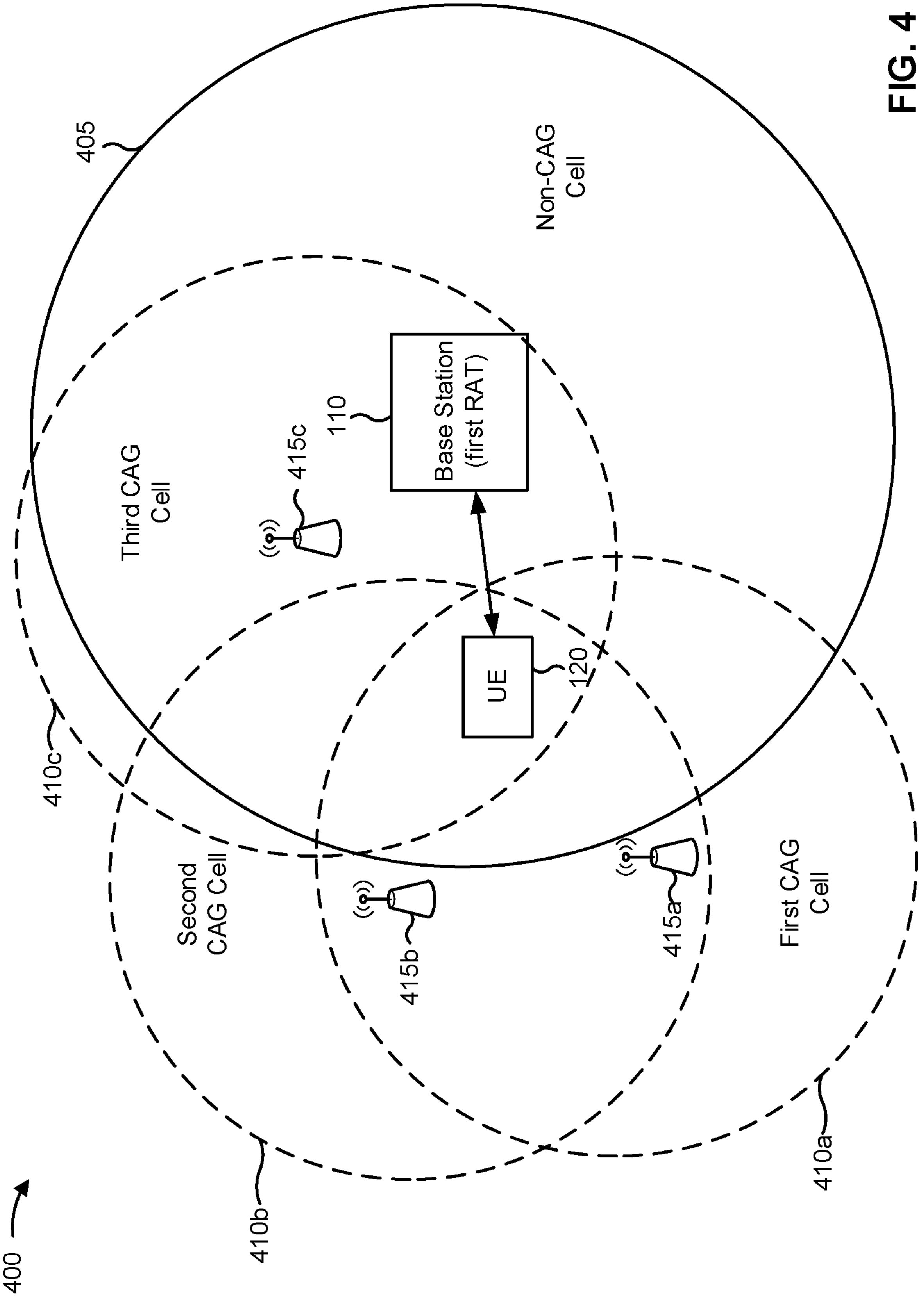
FIG. 4 is a diagram illustrating an example of a UE in communication with multiple network devices in a wireless network, in accordance with the present disclosure.

FIG. 4 is a diagram illustrating an example 400 of a UE 120 in communication with multiple network devices in a wireless network 100, in accordance with the present disclosure.

In some aspects, a wireless network (e.g., the wireless network 100 shown in FIG. 1, the wireless network associated with example 300 shown in FIG. 3, or another wireless network) may include one or more network elements associated with a non-public network (NPN). An NPN may be a wireless network accessible only by UEs having certain access permissions and/or privileges. The NPN may be a standalone NPN (SNPN) or a non-standalone NPN, such as a public network integrated (PNI) NPN (PNI-NPN) or another non-standalone NPN. An SNPN is a dedicated, private wireless network (e.g., a 5G network) that may be associated with an enterprise, a facility, and/or a site. For example, an SNPN may be associated with a particular corporate campus, a particular factory, and/or a particular industrial facility. Access to an SNPN may be limited to UEs having subscriptions to the SNPN.

A non-standalone NPN, such as a PNI-NPN, is an NPN made available via a public land mobile network (PLMN) to a select group of subscribers. In some cases, access to the PNI-NPN or other non-standalone NPN may be limited to a group referred to as a closed access group (CAG), and the PNI-NPN or other non-standalone NPN may be accessible via certain cells open only to the CAG, sometimes referred to as CAG cells. A CAG is a limited set of UEs or subscribers (e.g., fewer than all network subscribers) having access to certain cells in the network (e.g., CAG cells), which in some aspects may be cells having a small coverage area, such as femto cells, pico cells, or the like. When a cell is configured in a CAG mode (e.g., when a cell is a CAG cell), only those UEs identified in a subscriber list (e.g., the CAG) may access the corresponding cell for performing wireless communications. A subscribing UE may search for and connect to nearby CAG cells, which, due to their restricted access, may be less congested and thus have more bandwidth and less latency than other, unrestricted cells (sometimes referred to as non-CAG cells) open to all subscribers of a particular PLMN as well as subscribers of other PLMNs when in a roaming mode.

For a UE operating in a dual connectivity mode, such as one or more of the dual connectivity modes described above in connection with FIG. 3, the UE may not identify nearby CAG cells available to the UE when the UE is camped on or otherwise connected to a non-CAG cell operating on a first RAT, particularly if the CAG cells are associated with a second RAT different from the first RAT, as described in more detail below. As used herein, a UE being "camped on" a cell means the UE is in communication with the associated base station in order to monitor system information, perform measurements of the serving cell and neighboring cells based on measurement rules, and perform similar actions. In this regard, a UE that is camped on a cell may or may not be in a full-service and/or connected mode with the associated base station.

As shown in FIG. 4, when the UE 120 is camped on a cell of a first RAT (e.g., a non-CAG cell), the UE 120 may be within range of nearby CAG cells of a second RAT but may not locate the nearby CAG cells through normal measurement rules or the like. For example, the UE 120 in FIG. 4 is shown as being camped on a non-CAG cell 405 associated with a first base station 110. In this implementation, the first base station 110 may be associated with the first RAT, such as 4G LTE, and thus the non-CAG cell 405 enables communication with the UE 120 via the first RAT. Moreover, for purposes of the example, the UE 120 may be in full service within the non-CAG cell 405 and/or the signal strength of the non-CAG cell 405 may be above an inter-frequency search threshold, such as Sintersearch or a similar threshold. In some cases, the inter-frequency search threshold (e.g., Sintersearch) controls whether the UE 120 makes measurements of inter-frequency cells while camped. Because in this example the quality of the serving cell (e.g., non-CAG cell 405) is above the inter-frequency search threshold, the UE 120 will not measure other inter-frequency cells, and thus the UE 120 will not select away from the serving cell (e.g., non-CAG cell 405) even if there is another neighboring inter-frequency cell at a higher signal level, with higher bandwidth, having less latency, or the like.

More particularly, in the depicted example 400, the UE 120 is also within three neighboring CAG cells 410: a first CAG cell 410*a*, a second CAG cell 410*b*, and a third CAG cell 410*c*. Each of the CAG cells 410*a-c* may correspond to a respective base station 415 (e.g., first CAG base station 415*a*, second CAG base station 415*b*, and third CAG base station 415*c*, respectively) associated with a second RAT different than the first RAT, such as 5G NR or another RAT. Moreover, because the CAG cells 410*a-c* are associated with the second RAT, they may not be readily detected by the UE 120 while the UE is camped on the non-CAG cell 405 associated with the first RAT. This is because the non-CAG cell 405 may not broadcast information that identifies the CAG base stations 415*a-c* and/or the CAG cells 410*a-c* in a neighbor list or otherwise provide the UE 120 with an indication of the nearby CAG cells 410*a-c*. Moreover, when the service level of the non-CAG cell (the serving cell) is above the inter-frequency search threshold (e.g., Sintersearch or similar threshold), the UE 120 will not search for or otherwise locate the CAG cells 410*a-c* on its own. Thus, the UE 120 remains camped on the non-CAG cell 405, which may lead to in inefficient use of network resources, increased network congestion, decreased available bandwidth, and higher latency for UEs operating on the non-CAG cell 405.

Some techniques and apparatuses described herein enable efficient use of network resources by providing an autonomous search function and reselection process to identify and/or reselect to CAG cells. The autonomous search function of the UE may search for nearby CAG cells associated with a second RAT (such as 5G NR) when camped on a non-CAG cell associated with a first RAT (such as 4G LTE) different from the second RAT. If any suitable nearby CAG cells are located, the UE may associate the CAG cells with the non-CAG cell in a database (e.g., stored by the UE), thereby populating a candidate CAG cell list for possible reselection when the UE is camped on the non-CAG cell in the future. Moreover, in some aspects the UE may search the candidate CAG cell list and, when a suitable CAG cell is found according to measurement rules or other cell reselection criteria, the UE may perform a reselection process from the non-CAG cell operating on the first RAT to the suitable CAG cell operating on the second RAT. As a result, the UE is able to make more efficient use of network resources by storing the location of, and in some cases reselecting to, previously undetected CAG cells. This results in increased coverage options for the UE, leading to decreased network congestion, increased bandwidth, and lower latency for the UE communications.

As indicated above, FIG. 4 is provided as an example. Other examples may differ from what is described with respect to FIG. 4.

Figure 5:
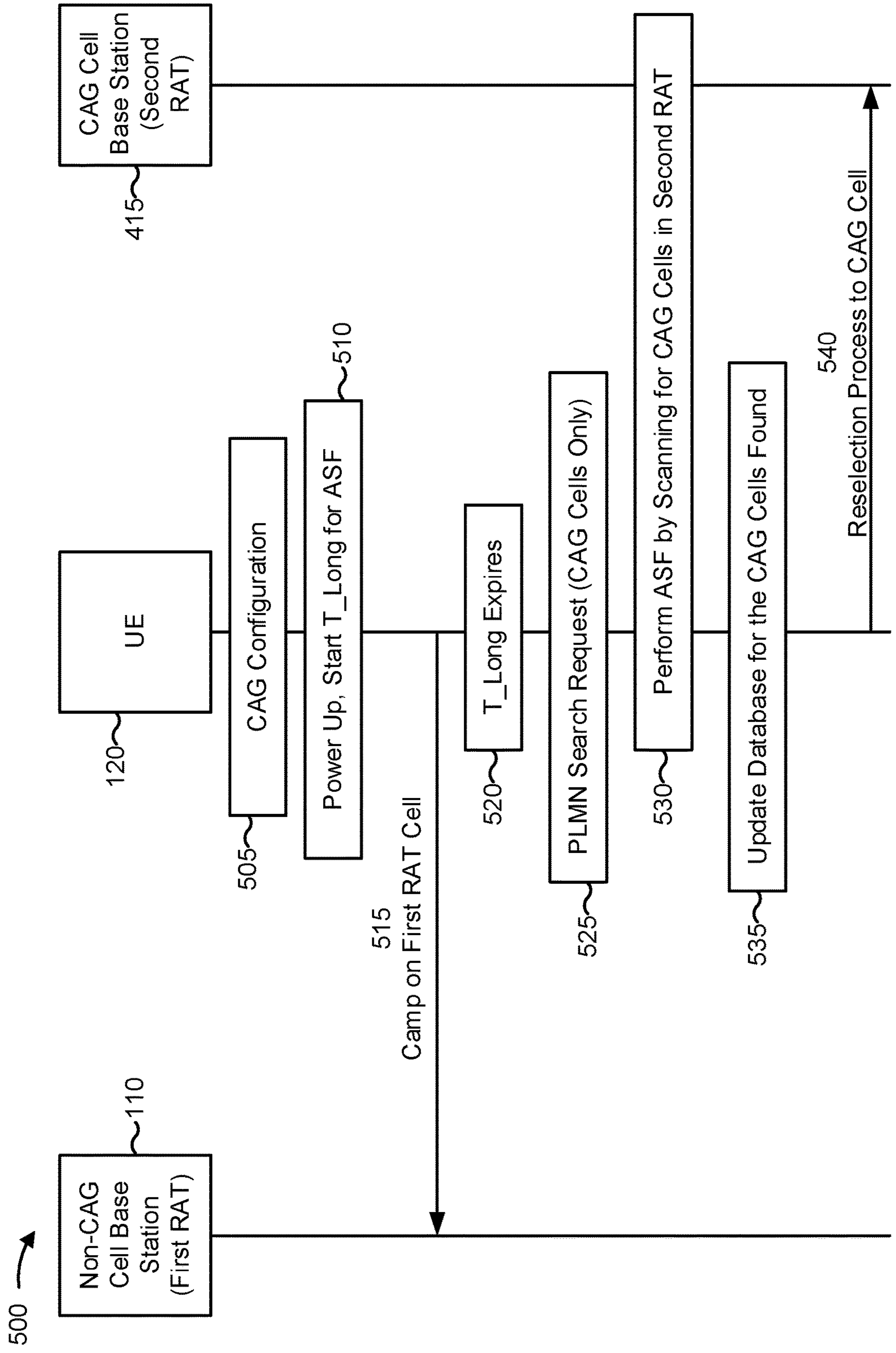
FIG. 5 is a diagram illustrating an example associated with an autonomous search function and reselection process for CAG cells, in accordance with the present disclosure.

FIG. 5 is a diagram illustrating an example 500 associated with an autonomous search function and reselection process for CAG cells, in accordance with the present disclosure.

At a high level, a UE 120 may communicate with one or more non-CAG base stations (e.g., base station 110) and one or more CAG base stations (e.g., CAG base station 415). The non-CAG base station 110 may form a part of a PLMN that is accessible for wireless communication by any UE associated with the PLMN and/or by UEs associated with a different PLMN but operating in a roaming mode or a similar mode. The CAG cell base station 415, on the other hand, may form part of an NPN, such as a PNI-NPN described above in connection with FIG. 4, and thus may be accessible only by UEs associated with a CAG corresponding to the CAG cell base station 415.

As shown by reference number 505, the UE 120 may receive a configuration or otherwise be configured to be part of one or more CAGs, such as the CAG associated the CAG cell base station 415. For example, at reference number 505 the UE 120 may receive a configuration from the core network or the like instructing the UE 120 to connect to associated CAG cells, when they are available, and the UE 120 may also be configured with a list of CAGs to which the UE 120 belongs. Moreover, in some aspects, CAG capability may be associated with a certain wireless communication specification, and thus, at reference number 505, the UE 120 may be configured to support the certain wireless communication specification.

When, at reference number 505, the UE 120 is configured to use one or more CAG cells, the UE 120 may trigger a timer that, once expired, will begin a search for one or more CAG cells associated with the UE 120. In some aspects, the timer may be started upon powering up the UE 120, as indicated by reference number 510. Moreover, in some aspects the timer may run for a first configured duration of time, sometimes referred to as T Long. As will be described more fully below in connection with reference numbers 520 and 525, the timer delays an autonomous search function of the UE 120 for a first configured duration of time (e.g., T Long) while the UE 120 camps on a serving cell (e.g., the cell associated with the non-CAG base station 110 or a similar cell associated with a macro base station or the like). More particularly, as indicated by reference number 515, the UE 120 may identify and camp on a cell associated with a first RAT, such as a non-CAG cell associated with the non-CAG cell base station 110 operating using the first RAT. In some aspects, the first RAT may be a non-5G NR RAT, such as a 4G LTE or other 4G RAT, a 3G RAT, or the like. After camping on the first cell associated with the first RAT (e.g., after connecting to the non-CAG cell base station 110), the UE 120 may wait to perform a search for nearby CAG cells until after the timer (e.g., the first configured duration of time, or T Long) has expired, as indicated at reference number 520. Once the timer (e.g., T Long) has expired, the UE 120 may perform a search for nearby CAG cells, which, again, is sometimes referred to as the autonomous search function of the UE 120.

More particularly, as indicated by reference number 525, once the first configured duration of time (e.g., T Long) expires, the UE 120 may initiate a PLMN search request, which, in some aspects, may initiate the autonomous search function of the UE 120 to search various frequency bands for cells associated with the PLMN to which the UE 120 belongs. As used herein, a search and/or the autonomous search function refers to measuring reference signals of CAG cells of a second RAT for the purpose of identifying suitable cells of the second RAT for reselection. In some aspects, the PLMN search request at reference number 525 may be limited to searching for only CAG cells. That is, the PLMN search request may initiate a scan of various frequencies to locate one or more CAG cells associated with the second RAT (e.g., 5G NR) but otherwise ignore or take no action with respect to other nearby non-CAG cells. A CAG cell may identify as a CAG cell by broadcasting a CAG identifier or similar parameter instead of or in addition to other parameters, such as a PLMN identifier or a similar parameter. The CAG identifier may be a unique identifier associated with the CAG cell base station (e.g., the CAG cell base station 415) that indicates that the base station is associated with a CAG and/or NPN and/or which indicates the particular CAG cell to which the cell belongs.

Moreover, in some aspects, the UE 120 may limit the autonomous search function to a particular frequency band or bands. For example, in some aspects the UE 120 may receive an indication from the network (e.g., via the non-CAG cell base station 110) indicating the frequency bands that are being deployed by the network in a given geographic area, and thus the autonomous search function may search only those bands. Additionally, or alternatively, the UE 120 may be configured to search a certain subset of bands. For example, the network may only use a particular subset of frequency bands for CAG cells and/or cells associated with the second RAT (e.g., 5G NR), and thus the UE 120 may be configured to only search that particular subset of frequency bands when implementing the autonomous search function.

In some aspects, the UE 120 may search for the nearby CAG cells, as indicated by reference number 530, even if the signal quality of the serving cell (e.g., the first RAT cell associated with the non-CAG cell base station 110) is above an inter-frequency search threshold (e.g., Sintersearch or a similar threshold). Traditionally, a UE would not perform an inter-frequency search, and would thus not locate nearby cells of the second RAT (including CAG cells), when the serving cell quality is above the inter-frequency search threshold. This is reflective of the serving cell providing a high enough level of service that the UE would not expend resources to look for an inter-frequency cell for possible reselection.

However, in some aspects the autonomous search function may search for nearby CAG cells even if the quality of the serving cell is above the inter-frequency search threshold (e.g., Sintersearch or a similar threshold) in order to index or otherwise store the CAG cell identity as being nearby the serving cell in case conditions change and/or for immediate reselection in instances where the serving quality of the CAG cell exceeds that of the serving cell. That is, when initiated at reference number 525, the autonomous search function may commence without regard to the inter-frequency search threshold. Put another way, the UE 120 may search for the nearby CAG cells associated with a second RAT after the first configured duration of time (e.g., T Long) expires, regardless of a serving quality of the non-CAG cell (e.g., the cell associated with the non-CAG cell base station 110).

Returning to reference number 530, the autonomous search function may search for nearby CAG cells by scanning various frequencies for information related to one or more CAG cells associated with the second RAT. For any CAG cells identified by the UE 120 that are associated with the UE 120 (e.g., a CAG cell for which the UE 120 belongs to the corresponding CAG), the UE 120 may update a CAG cell database (sometimes referred to as a fingerprinted database) with location information about the CAG cell so that the UE 120 may reselect to the CAG cell, either immediately and/or in the future if the quality of the serving cell falls below a certain threshold. In some aspects, the database may be associated with an RRC layer of the UE 120, and one or more of the operations described herein as being associated with the CAG cell database may be performed by the RRC layer or similar component of the UE 120 associated with the second RAT, such as a NR RRC component or a similar component.

For example, the UE 120 may associate the CAG cell with the non-CAG cell in the CAG cell database (e.g., fingerprinted database) as indicated by reference number 535, such as by indexing the CAG cell, a CAG cell identifier associated with the CAG cell, a physical-layer cell identity (PCI) associated with the CAG cell, a frequency band associated with the CAG cell, or other suitable parameter with an identifier of the non-CAG cell base station 110 such as a cell global identity (CGI) of the base station 110. In aspects in which the non-CAG cell base station 110 is associated with 4G LTE and in which the CAG cell base station 415 is associated with 5G NR, at reference number 535 a PCI of each located CAG cell may be associated in the CAG cell database with the Evolved-Universal Terrestrial Radio Access Network (E-UTRAN) CGI (ECGI) of the non-CAG cell base station 110. In some aspects, the database may be stored using a hash table data structure. By associating one or more CAG cells with the non-CAG cells in the CAG cell database at reference number 535, the UE 120 may quickly locate any nearby CAG cells via the CAG cell database during a reselection process even if the locations of the CAG cells are not otherwise provided to the UE 120 via a neighbor list broadcast by the non-CAG cell base station 110 or otherwise.

In some aspects, the autonomous search function may be delayed for some period of time based at least in part on certain user activity or other activity or processes at the UE 120. For example, the UE 120 may delay the autonomous search function (e.g., the search for nearby CAG cells, as indicated by reference number 530) for the first configured time duration (e.g., T Long) if the CAG allowed list from the network is empty, such as when the UE 120 does not currently belong to any CAGs.

Additionally, or alternatively, the UE 120 may delay the autonomous search function for the first configured time duration if the UE 120 is not configured to access CAG cells, such as when the UE 120 does not support a feature set used to access CAG cells as specified in a wireless communication specification, or when a CAG configuration is disabled at the UE 120. Additionally, or alternatively, the UE 120 may delay the autonomous search function for the first configured time duration if the UE 120 camps on a base station associated with the second RAT (e.g., 5G NR) meeting a quality of service threshold. For example, if the UE 120 were to reselect from the non-CAG cell base station 110 associated with the first RAT (e.g., 4G LTE) to either another non-CAG cell base station associated with the second RAT or a CAG cell base station associated with the second RAT, and if the reselected cell has a signal quality above a certain threshold, then the autonomous search function may be delayed for the first configured time period. Once the first configured time duration elapses, the autonomous search function may be resumed if certain criteria are met, such as if the UE 120 has since reselected to a cell associated with the first RAT and/or if the signal quality of the serving cell has since fallen below the quality threshold. Additionally, or alternatively, the UE 120 may delay the autonomous search function for the first configured time duration if the UE 120 enters into a limited operation mode, such as a low power mode, a field test mode, or a similar limited operation mode.

In some aspects, the UE 120 may delay the autonomous search function for a second configured time duration different from the first configured time duration. In some implementations, the second configured time duration may be shorter than the first configured time duration, and the second configured time duration may sometimes be referred to as T Short.

In some aspects, the UE 120 may delay the autonomous search function for the second configured time duration (e.g., T Short) if a service level of the UE 120 is below a threshold service level. For example, if the UE 120 is below full service on the non-CAG cell 405, the UE 120 may delay the autonomous search function for the second configured time duration. Once the second configured time duration has elapsed, the UE 120 may continue with the autonomous search function if the service level exceeds the threshold service level, otherwise the autonomous search function may be delayed one or more additional times for the second configured time duration until the service level reaches the threshold service level. Moreover, in some aspects the UE 120 may delay the autonomous search function for the second configured time duration if the UE 120 is above the threshold service level (e.g., the UE 120 is in full service), but the UE 120 is not camped on the first RAT (e.g., 4G LTE) or the second RAT (e.g., 5G NR). In some aspects, the UE 120 may delay the autonomous search function for the second configured time duration if a previous search for nearby CAG cells failed for any reason, such as when there were insufficient transceiver resources or other resources available to perform the search. Moreover, in some aspects the UE 120 may delay the autonomous search function for the second configured time duration if the UE 120 is performing a call activity (e.g., a voice call or a video call), or if the UE 120 is performing another type of ongoing manual PLMN (MPLMN) search, or if a thermal level of the UE 120 is above a threshold thermal level. Moreover, when the CAG cell search has been initiated, the search may be terminated at any time a user activity occurs at the UE 120 such as when the UE 120 is placing or receiving a call or receiving other user input.

In some aspects, the UE 120 may perform a reselection process from the non-CAG cell of the first RAT (e.g., the cell associated with the non-CAG cell base station 110, and which may be a 4G LTE cell) to the CAG cell of the second RAT different from the first RAT (e.g., the cell associated with the CAG cell base station 415, and which may be 5G NR cell) based at least in part on the search and/or based at least in part on the associated database entries, as indicated by reference number 540. In some aspects, the reselection process indicated at reference number 540 may include locating a previously visited and databased CAG cell (sometimes referred to as fingerprinted CAG cell candidates) by referencing the CAG cell database. For example, during the autonomous search function performed at reference number 530 while the UE 120 was camped on the non-CAG cell base station 110, the UE 120 may have located the CAG cell associated with the CAG cell base station 415, and thus the UE 120 may have associated, in the CAG cell database, the CAG cell (e.g., the cell associated with the CAG cell base station 415) with the non-CAG cell (e.g., the cell associated with the non-CAG cell base station 110). When the UE 120 is thereafter camped on the non-CAG cell, it may perform a cell reselection process by searching for a known nearby CAG cell and reselecting accordingly. In some aspects, the UE 120 may use its background PLMN (BPLMN) search capability to search for CAG cells by the PCI or other identifier of the CAG cell base station 415 associated in the database with the ECGI or other identifier of the non-CAG cell base station 110 on which the UE 120 is camped. Once located, if the CAG cell fulfills certain cell reselection criteria, the UE 120 can reselect to the CAG cell, as generally indicated by reference number 540.

In some aspects, the reselection process indicated by reference number 540 may be initiated when the UE 120 is in an IDLE camped status on the non-CAG cell (e.g., the cell associated with the Non-CAG cell base station 110), when the UE 120 is not otherwise connected to the second RAT (e.g., 5G NR), and/or when fingerprinted CAG cell candidates are present. Once initiated, the UE 120 may perform a PLMN search only on the fingerprinted CAG cell candidates to return a search result of one or more fingerprinted CAG cell candidates. The UE 120 may remove from the search result (e.g., not consider for reselection) any of the search results that do not meet certain criteria. For example, the UE 120 may remove a fingerprinted CAG cell candidate from the search result if the candidate does not satisfy a cell selection criterion, sometimes referred to as an S criteria. Additionally, or alternatively, the UE 120 may remove a fingerprinted CAG cell candidate from the search result if the candidate is not included in a list of allowed cells for reselection, sometimes referred to as a whitelist. Additionally, or alternatively, the UE 120 may remove a fingerprinted CAG cell candidate from the search result if the candidate is not associated with a PLMN identifier associated with the UE 120.

Once one or more fingerprinted CAG cell candidates have been located and any fingerprinted CAG cell candidates have been removed from the search result, the UE 120 may perform signal quality measurements and/or other measurements on the search results, and perform reselection to one of the fingerprinted CAG cell candidates, when it is appropriate to do so in light of the measurements. Additionally, or alternatively, the UE 120 may perform signal quality measurements and/or other measurements on the one or more CAG cells when the one or more CAG cells are first identified by the autonomous search function and/or when the one or more CAG cells are initially stored in the database. Thus, in some aspects the UE 120 may use signal quality measurements and/or other measurements stored in the database and associated with the one or more CAG cell candidates as part of the reselection process shown at reference number 540.

In some aspects, when the search result includes multiple fingerprinted CAG cell candidates, the UE 120 may rank the various cells and perform the reselection process to the highest ranked cell that meets the reselection criteria of the UE 120. For example, the UE 120 may rank the CAG cell candidates based at least in part on cell quality. In some aspects, cell quality may be determined based at least in part on one or more parameters associated with one or more reference signals received from the respective CAG cell candidates, such as an RSSI parameter, an RSRQ parameter, a CQI parameter, and/or a similar parameter. In some aspects, the UE 120 may first rank CAG cells associated with a respective frequency band (e.g., FR1, FR2, FR3, FR4a. FR4-1, FR4, FR5, and so forth), and then rank the top CAG cells from each frequency band to create an overall ranked CAG cell candidates list. In some aspects, the UE 120 may then perform a reselection process to the CAG cell candidate with the highest cell quality. For example, the UE 120 may determine if the highest ranked CAG cell candidate meets the reselection criteria of the UE 120, and if so, perform cell reselection to the highest ranked CAG cell candidate. If the highest ranked CAG cell candidate does not meet the reselection criteria of the UE 120, the UE 120 may then determine if the next highest ranked CAG cell candidate meets the reselection criteria, and continues down the ranked candidate list until a suitable CAG cell candidate meets the cell reselection criteria, and thus performs the reselection process to the suitable CAG cell candidate. If none of the CAG cell candidates satisfies the reselection criteria of the UE 120, the UE 120 may forgo cell reselection to a CAG cell and thus remain camped on the non-CAG cell (e.g., the cell associated with the non-CAG cell base station 110), or else perform reselection to another cell, such as another nearby non-CAG cell that satisfies the reselection criteria of the UE 120.

In some aspects, the autonomous search function described above in connection with reference number 530 may repeat according to a configured periodicity. During one period of the autonomous search function, the UE 120 may scan all available or configured frequencies to locate any CAG cells for inclusion in the database, and then, once finished, may repeat the process according to the configured periodicity (e.g., the search may be performed one time during every configured time period associated with the search, sometimes referred to as an autonomous search function time period). In some aspects, the periodicity may be changed (e.g., the autonomous search function time period may be shortened or lengthened) according to a mobility of the UE 120. For example, for a relatively stable UE 120, the autonomous search function time period may be increased (e.g., the time between searches may become longer), because in such implementations it may be unlikely that any new CAG cell candidates will be discovered during subsequent searches. However, for a relatively mobile UE 120, the autonomous search function time period may be decreased (e.g., the time between searches may become shorter), because in such implementations it may be more likely to discover new CAG cell candidates during subsequent searches as the mobile UE 120 moves into range of new CAG cells. A relatively stable UE 120 may be associated with a mobility value (e.g., a velocity, a speed, a displacement, a rotation, a number of handovers, a high speed transit flag, or the like) that does not satisfy a threshold, whereas a relatively mobile UE 120 may be associated with a mobility value that satisfies a threshold.

In some aspects, the UE 120 may adjust the periodicity of the periodic autonomous search function based on a motion sensor output, such as by reducing the periodicity when the motion sensor output indicates that the UE 120 is relatively stable and by increasing the periodicity when the motion sensor output indicates that the UE 120 is relatively mobile. Additionally, or alternatively, the UE 120 may adjust the periodicity of the periodic autonomous search function based on a connected mode status of the UE 120 on the first RAT. For example, when the UE 120 is in a connected mode on the first RAT (e.g., is in a connected mode with the non-CAG cell base station 110), the autonomous search function time period may be decreased (e.g., the time between searches may become shorter). Additionally, or alternatively, the UE 120 may adjust the periodicity of the periodic autonomous search function based on a geographic location of the UE 120. For example, the UE 120 may receive an indication from the network indicating that CAG cells are deployed near certain geographic locations, and thus may determine that candidate CAG cells may be nearby when the UE 120 is near such locations and decrease the autonomous search function time period accordingly. In such implementations, the UE 120 may use a global positioning system (GPS) position of the UE 120, or a CGI or a similar identifier of a base station 110 to which the UE 120 is camped on, or a basic service set identifier (BSSI) of a wireless network to which the UE 120 is connected, or a similar identifier to determine the geographic location of the UE 120 and adjust the periodicity accordingly.

As indicated above, FIG. 5 is provided as an example. Other examples may differ from what is described with respect to FIG. 5.

Figure 6:
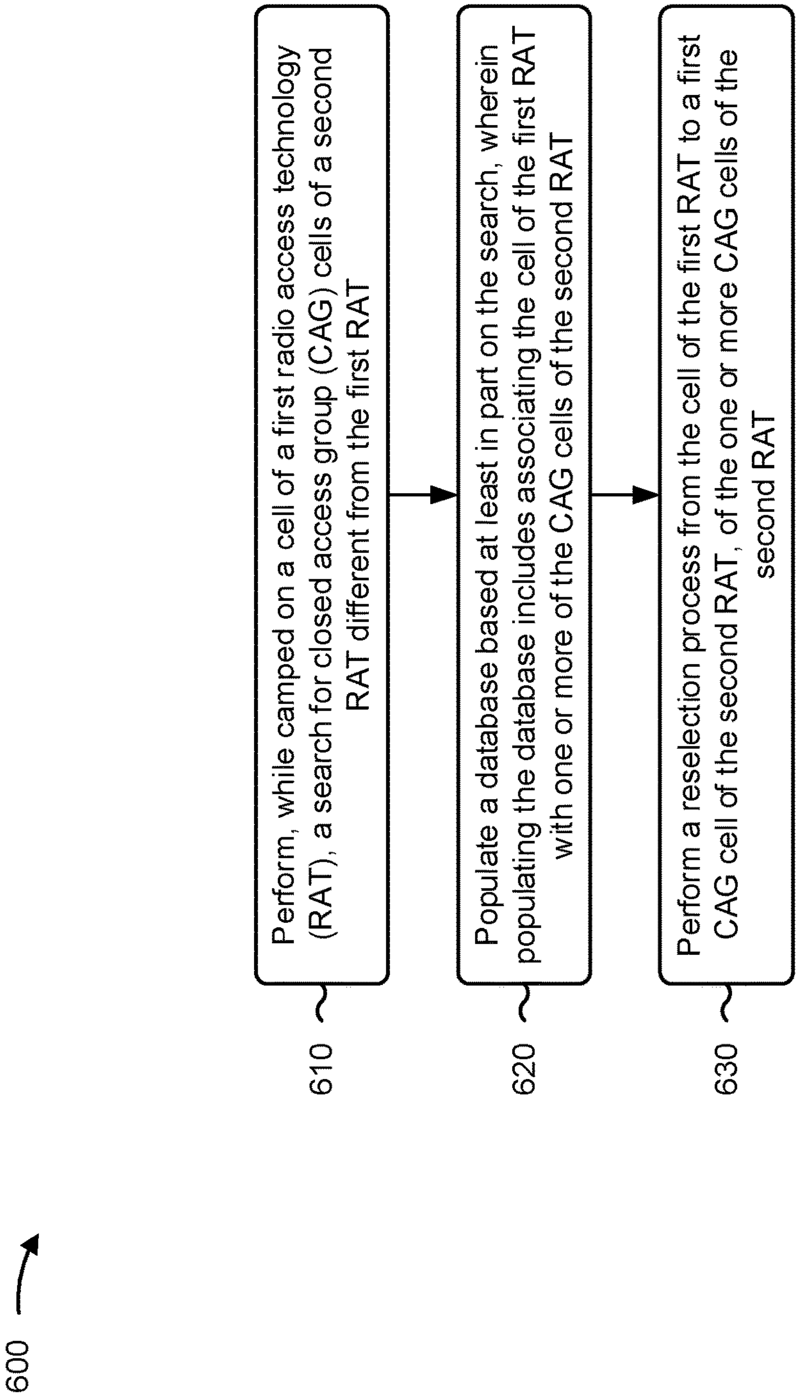
FIG. 6 is a diagram illustrating an example process performed, for example, by a UE, in accordance with the present disclosure.

FIG. 6 is a diagram illustrating an example process 600 performed, for example, by a UE, in accordance with the present disclosure. Example process 600 is an example where the UE (e.g., UE 120) performs operations associated with closed access group cell search and reselection.

As shown in FIG. 6, in some aspects, process 600 may include performing, while camped on a cell of a first RAT, a search for CAG cells of a second RAT different from the first RAT (block 610). For example, the UE (e.g., using communication manager 140 and/or search component 708, depicted in FIG. 7) may perform, while camped on a cell of a first RAT, a search for CAG cells of a second RAT different from the first RAT, as described above.

As further shown in FIG. 6, in some aspects, process 600 may include populating a database based at least in part on the search, wherein populating the database includes associating the cell of the first RAT with one or more of the CAG cells of the second RAT (block 620). For example, the UE (e.g., using communication manager 140 and/or database component 710, depicted in FIG. 7) may populate a database based at least in part on the search, wherein populating the database includes associating the cell of the first RAT with one or more of the CAG cells of the second RAT, as described above.

As further shown in FIG. 6, in some aspects, process 600 may include performing a reselection process from the cell of the first RAT to a first CAG cell of the second RAT, of the one or more CAG cells of the second RAT (block 630). For example, the UE (e.g., using communication manager 140 and/or reselection component 712, depicted in FIG. 7) may perform a reselection process from the cell of the first RAT to a first CAG cell of the second RAT, of the one or more CAG cells of the second RAT, as described above.

Process 600 may include additional aspects, such as any single aspect or any combination of aspects described below and/or in connection with one or more other processes described elsewhere herein.

In a first aspect, process 600 includes receiving an indication of a neighbor list indicating neighboring cells to the cell of the first RAT available for cell selection, wherein the CAG cells of the second RAT are not included in the neighbor list.

In a second aspect, alone or in combination with the first aspect, a quality of the cell of the first RAT is above an inter-frequency cell search threshold.

In a third aspect, alone or in combination with one or more of the first and second aspects, the first RAT is a 4G Long Term Evolution (LTE) RAT, and wherein the second RAT is a 5G New Radio (NR) RAT.

In a fourth aspect, alone or in combination with one or more of the first through third aspects, process 600 includes receiving a configuration indicating a frequency band of the second RAT associated with the search.

In a fifth aspect, alone or in combination with one or more of the first through fourth aspects, process 600 includes delaying the search for a first configured duration.

In a sixth aspect, alone or in combination with one or more of the first through fifth aspects, delaying the search for the first configured duration is based at least in part on at least one of the UE powering up, receiving an indication that the UE is not associated with any CAG cells of the second RAT, receiving an indication that a CAG configuration of the UE does not support communication over CAG cells, camping on a cell associated with the second RAT, entering a low power mode, or entering a field test mode.

In a seventh aspect, alone or in combination with one or more of the first through sixth aspects, process 600 includes delaying the search for a second configured duration shorter than the first configured duration.

In an eighth aspect, alone or in combination with one or more of the first through seventh aspects, delaying the search for the second configured duration is based at least in part on at least one of the UE having a service level not satisfying a threshold service level, not camping on either of the first RAT or the second RAT, failing to complete a prior search for the CAG cells of the second RAT, performing a call activity, performing a manual public land mobile network search, or not satisfying a threshold thermal level.

In a ninth aspect, alone or in combination with one or more of the first through eighth aspects, process 600 includes terminating the search based at least in part on at least one of receiving user input or receiving an incoming call.

In a tenth aspect, alone or in combination with one or more of the first through ninth aspects, populating the database includes associating a cell global identity (CGI) of the cell of the first RAT with the one or more of the CAG cells of the second RAT.

In an eleventh aspect, alone or in combination with one or more of the first through tenth aspects, populating the database includes indexing the one or more of the CAG cells of the second RAT using a hash table data structure.

In a twelfth aspect, alone or in combination with one or more of the first through eleventh aspects, the reselection process includes searching for the first CAG cell based at least in part on the database.

In a thirteenth aspect, alone or in combination with one or more of the first through twelfth aspects, searching for the first CAG cell is based at least in part on the UE camping on the first RAT in an idle mode, the UE not being in a connected mode for the second RAT, and the UE determining that the first CAG cell is associated in the database with the cell of the first RAT.

In a fourteenth aspect, alone or in combination with one or more of the first through thirteenth aspects, searching for the first CAG cell further includes removing a second CAG cell, of the one or more CAG cells of the second RAT, from a search result.

In a fifteenth aspect, alone or in combination with one or more of the first through fourteenth aspects, removing the second CAG cell from the search result is based at least in part on at least one of the second CAG cell not satisfying a cell selection criterion, the second CAG cell not being included in a list of allowed cells for reselection, or the second CAG cell not being associated with a public land mobile network identifier associated with the UE.

In a sixteenth aspect, alone or in combination with one or more of the first through fifteenth aspects, performing the reselection process includes performing a cell reselection measurement on the first CAG cell.

In a seventeenth aspect, alone or in combination with one or more of the first through sixteenth aspects, process 600 includes performing reoccurring searches for the CAG cells of the second RAT with a periodicity.

In an eighteenth aspect, alone or in combination with one or more of the first through seventeenth aspects, process 600 includes adjusting the periodicity based at least in part on at least one of a sensed motion of the UE, a connected mode status of the UE on the first RAT, or a geographic location of the UE.

In a nineteenth aspect, alone or in combination with one or more of the first through eighteenth aspects, adjusting the periodicity is based at least in part on the geographic location of the UE, and wherein the geographic location is determined based at least in part on one or more of a global positioning system location of the UE, a cell global identity of the cell of the first RAT, or a basic service set identifier of a wireless network to which the UE is connected.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
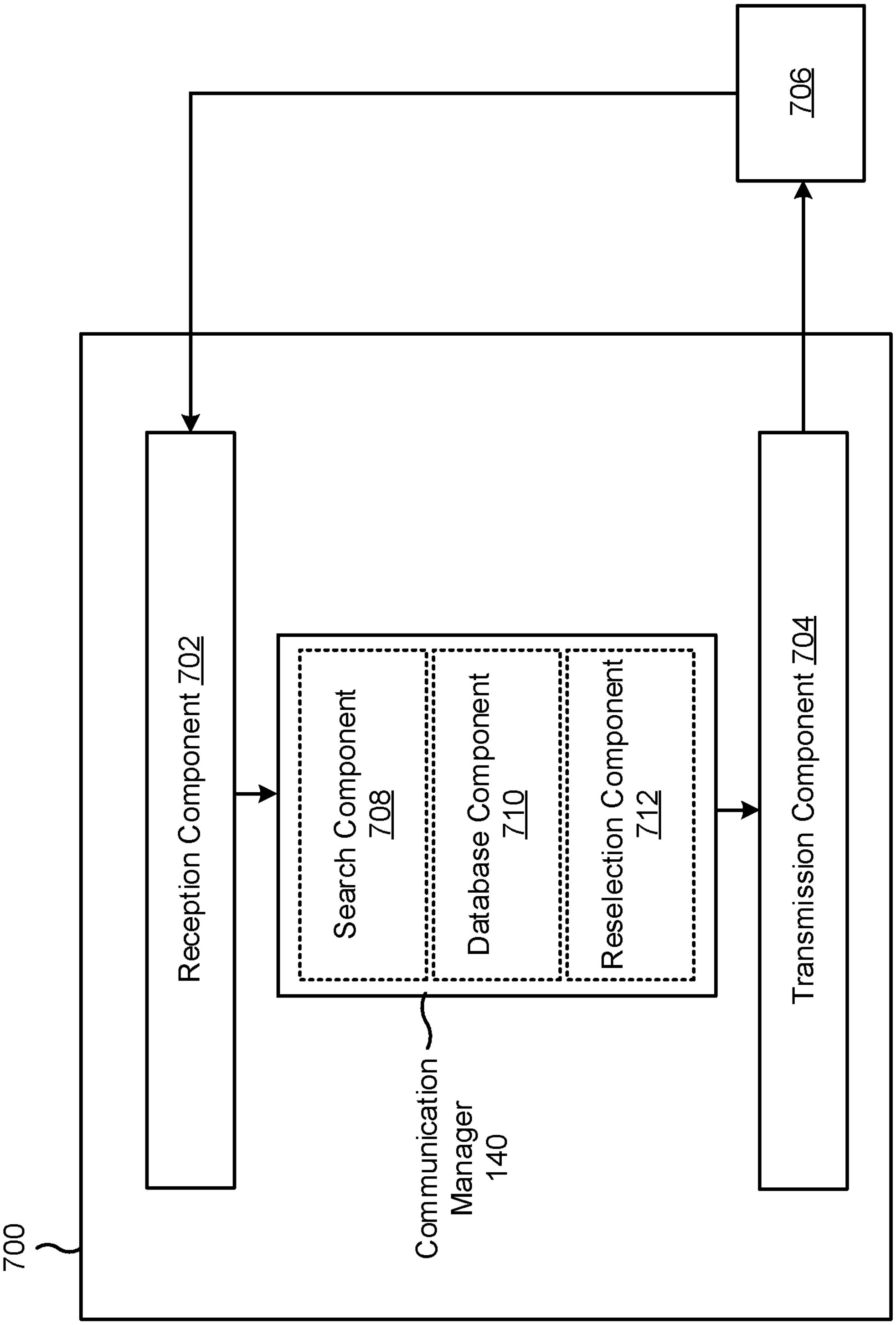
FIG. 7 is a diagram of an example apparatus for wireless communication, in accordance with the present disclosure.

FIG. 7 is a diagram of an example apparatus 700 for wireless communication, in accordance with the present disclosure. The apparatus 700 may be a UE, or a UE may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include the communication manager 140. The communication manager 140 may include one or more of a search component 708, a database component 710, or a reselection component 712, among other examples.

In some aspects, the apparatus 700 may be configured to perform one or more operations described herein in connection with FIG. 5. Additionally, or alternatively, the apparatus 700 may be configured to perform one or more processes described herein, such as process 600 of FIG. 6. In some aspects, the apparatus 700 and/or one or more components shown in FIG. 7 may include one or more components of the UE described in connection with FIG. 2. Additionally, or alternatively, one or more components shown in FIG. 7 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 700. In some aspects, the reception component 702 may include one or more antennas, a modem, a demodulator, a MIMO detector, a receive processor, a controller/processor, a memory, or a combination thereof, of the UE described in connection with FIG. 2.

The transmission component 704 may transmit communications, such as reference signals, control information, data communications, or a combination thereof, to the apparatus 706. In some aspects, one or more other components of the apparatus 700 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modem, a modulator, a transmit MIMO processor, a transmit processor, a controller/processor, a memory, or a combination thereof, of the UE described in connection with FIG. 2. In some aspects, the transmission component 704 may be co-located with the reception component 702 in a transceiver.

The search component 708 may perform, while camped on a cell of a first RAT, a search for CAG cells of a second RAT different from the first RAT. The database component 710 may populate a database based at least in part on the search, wherein populating the database includes associating the cell of the first RAT with one or more of the CAG cells of the second RAT. The reselection component 712 may perform a reselection process from the cell of the first RAT to a first CAG cell of the second RAT, of the one or more CAG cells of the second RAT.

The reception component 702 may receive an indication of a neighbor list indicating neighboring cells to the cell of the first RAT available for cell selection, wherein the CAG cells of the second RAT are not included in the neighbor list. The reception component 702 may receive a configuration indicating a frequency band of the second RAT associated with the search. The search component 708 may delay the search for a first configured duration. The search component 708 may delay the search for a second configured duration shorter than the first configured duration. The search component 708 may terminate the search based at least in part on at least one of receiving user input or receiving an incoming call. The search component 708 may perform reoccurring searches for the CAG cells of the second RAT with a periodicity. The search component 708 may adjust the periodicity based at least in part on at least one of a sensed motion of the UE; a connected mode status of the UE on the first RAT; or a geographic location of the UE.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

The following provides an overview of some Aspects of the present disclosure:

Aspect 1: A method of wireless communication performed by a UE, comprising: performing, while camped on a cell of a first RAT, a search for CAG cells of a second RAT different from the first RAT; populating a database based at least in part on the search, wherein populating the database includes associating the cell of the first RAT with one or more of the CAG cells of the second RAT; and performing a reselection process from the cell of the first RAT to a first CAG cell of the second RAT, of the one or more CAG cells of the second RAT.

Aspect 2: The method of Aspect 1, further comprising receiving an indication of a neighbor list indicating neighboring cells to the cell of the first RAT available for cell selection, wherein the CAG cells of the second RAT are not included in the neighbor list.

Aspect 3: The method of any of Aspects 1-2, wherein a quality of the cell of the first RAT is above an inter-frequency cell search threshold.

Aspect 4: The method of any of Aspects 1-3, wherein the first RAT is a 4G Long Term Evolution (LTE) RAT, and wherein the second RAT is a 5G New Radio (NR) RAT.

Aspect 5: The method of any of Aspects 1-4, further comprising receiving a configuration indicating a frequency band of the second RAT associated with the search.

Aspect 6: The method of any of Aspect 1-5, further comprising delaying the search for a first configured duration.

Aspect 7: The method of any of Aspects 1-6, wherein delaying the search for the first configured duration is based at least in part on at least one of the UE: powering up; receiving an indication that the UE is not associated with any CAG cells of the second RAT; receiving an indication that a CAG configuration of the UE does not support communication over CAG cells; camping on a cell associated with the second RAT; entering a low power mode; or entering a field test mode.

Aspect 8: The method of any of Aspects 1-7, further comprising delaying the search for a second configured duration shorter than the first configured duration.

Aspect 9: The method of any of Aspects 1-8, wherein delaying the search for the second configured duration is based at least in part on at least one of the UE: having a service level not satisfying a threshold service level; not camping on either of the first RAT or the second RAT; failing to complete a prior search for the CAG cells of the second RAT; performing a call activity; performing a manual public land mobile network search; or not satisfying a threshold thermal level.

Aspect 10: The method of any of Aspects 1-9, further comprising terminating the search based at least in part on at least one of receiving user input or receiving an incoming call.

Aspect 11: The method of any of Aspects 1-10, wherein populating the database includes associating a cell global identity (CGI) of the cell of the first RAT with the one or more of the CAG cells of the second RAT.

Aspect 12: The method of any of Aspects 1-11, wherein populating the database includes indexing the one or more of the CAG cells of the second RAT using a hash table data structure.

Aspect 13: The method of any of Aspects 1-12, wherein the reselection process includes searching for the first CAG cell based at least in part on the database.

Aspect 14: The method of any of Aspects 1-13, wherein searching for the first CAG cell is based at least in part on the UE camping on the first RAT in an idle mode, the UE not being in a connected mode for the second RAT, and the UE determining that the first CAG cell is associated in the database with the cell of the first RAT.

Aspect 15: The method of any of Aspects 1-14, wherein searching for the first CAG cell further includes removing a second CAG cell, of the one or more CAG cells of the second RAT, from a search result.

Aspect 16: The method of any of Aspects 1-15, wherein removing the second CAG cell from the search result is based at least in part on at least one of: the second CAG cell not satisfying a cell selection criterion; the second CAG cell not being included in a list of allowed cells for reselection; or the second CAG cell not being associated with a public land mobile network identifier associated with the UE.

Aspect 17: The method of any of Aspects 1-16, wherein performing the reselection process includes performing a cell reselection measurement on the first CAG cell.

Aspect 18: The method of any of Aspects 1-17, further comprising performing reoccurring searches for the CAG cells of the second RAT with a periodicity.

Aspect 19: The method of any of Aspects 1-18, further comprising adjusting the periodicity based at least in part on at least one of: a sensed motion of the UE; a connected mode status of the UE on the first RAT; or a geographic location of the UE.

Aspect 20: The method of any of Aspects 1-19, wherein adjusting the periodicity is based at least in part on the geographic location of the UE, and wherein the geographic location is determined based at least in part on one or more of a global positioning system location of the UE, a cell global identity of the cell of the first RAT, or a basic service set identifier of a wireless network to which the UE is connected.

Aspect 21: An apparatus for wireless communication at a device, comprising a processor; memory coupled with the processor; and instructions stored in the memory and executable by the processor to cause the apparatus to perform the method of one or more of Aspects 1-20.

Aspect 22: A device for wireless communication, comprising a memory and one or more processors coupled to the memory, the one or more processors configured to perform the method of one or more of Aspects 1-20.

Aspect 23: An apparatus for wireless communication, comprising at least one means for performing the method of one or more of Aspects 1-20.

Aspect 24: A non-transitory computer-readable medium storing code for wireless communication, the code comprising instructions executable by a processor to perform the method of one or more of Aspects 1-20.

Aspect 25: A non-transitory computer-readable medium storing a set of instructions for wireless communication, the set of instructions comprising one or more instructions that, when executed by one or more processors of a device, cause the device to perform the method of one or more of Aspects 1-20.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:

a memory; and one or more processors, coupled to the memory, configured to:

perform, while camped on a non-closed access group (CAG) cell of a first radio access technology (RAT), a search for CAG cells of a second RAT different from the first RAT;

populate a database based at least in part on the search, wherein populating the database includes associating the non-CAG cell of the first RAT with one or more of the CAG cells of the second RAT; and perform, while camped on the non-CAG cell of the first RAT and based at least in part on the search for CAG cells and the population of the database, a reselection process from the non-CAG cell of the first RAT to a first CAG cell of the second RAT, of the one or more CAG cells of the second RAT.

2. The apparatus of claim 1, wherein the one or more processors are further configured to receive an indication of a neighbor list indicating neighboring cells to the non-CAG cell of the first RAT available for cell selection, wherein the CAG cells of the second RAT are not included in the neighbor list.

3. The apparatus of claim 1, wherein a quality of the non-CAG cell of the first RAT is above an inter-frequency cell search threshold.

4. The apparatus of claim 1, wherein the first RAT is a 4G Long Term Evolution (LTE) RAT, and wherein the second RAT is a 5G New Radio (NR) RAT.

5. The apparatus of claim 1, wherein the one or more processors are further configured to receive a configuration indicating a frequency band of the second RAT associated with the search.

6. The apparatus of claim 1, wherein the one or more processors are further configured to delay the search for a first configured duration.

7. The apparatus of claim 6, wherein delaying the search for the first configured duration is based at least in part on at least one of the UE:

powering up;

receiving an indication that the UE is not associated with any CAG cells of the second RAT;

receiving an indication that a CAG configuration of the UE does not support communication over CAG cells;

camping on a cell associated with the second RAT;

entering a low power mode; or entering a field test mode.

8. The apparatus of claim 6, wherein the one or more processors are further configured to delay the search for a second configured duration shorter than the first configured duration.

9. The apparatus of claim 8, wherein delaying the search for the second configured duration is based at least in part on at least one of the UE:

having a service level not satisfying a threshold service level;

not camping on either of the first RAT or the second RAT;

failing to complete a prior search for the CAG cells of the second RAT;

performing a call activity;

performing a manual public land mobile network search; or not satisfying a threshold thermal level.

10. The apparatus of claim 1, wherein the one or more processors are further configured to terminate the search based at least in part on at least one of receiving user input or receiving an incoming call.

11. The apparatus of claim 1, wherein the one or more processors, to populate the database, are configured to associate a cell global identity (CGI) of the cell of the first RAT with the one or more of the CAG cells of the second RAT.

12. The apparatus of claim 1, wherein the one or more processors, to populate the database, are configured to index the one or more of the CAG cells of the second RAT using a hash table data structure.

13. The apparatus of claim 1, wherein the reselection process includes searching for the first CAG cell based at least in part on the database.

14. The apparatus of claim 13, wherein searching for the first CAG cell is based at least in part on the UE camping on the first RAT in an idle mode, the UE not being in a connected mode for the second RAT, and the UE determining that the first CAG cell is associated in the database with the cell of the first RAT.

15. The apparatus of claim 13, wherein the one or more processors, to search for the first CAG cell, are configured to remove a second CAG cell, of the one or more CAG cells of the second RAT, from a search result.

16. The apparatus of claim 15, wherein removing the second CAG cell from the search result is based at least in part on at least one of:

the second CAG cell not satisfying a cell selection criterion;

the second CAG cell not being included in a list of allowed cells for reselection; or the second CAG cell not being associated with a public land mobile network identifier associated with the UE.

17. The apparatus of claim 1, wherein the one or more processors, to perform the reselection process, are configured to perform a cell reselection measurement on the first CAG cell.

18. The apparatus of claim 1, wherein the one or more processors are further configured to perform reoccurring searches for the CAG cells of the second RAT with a periodicity.

19. The apparatus of claim 18, wherein the one or more processors are further configured to adjust the periodicity based at least in part on at least one of:

a sensed motion of the UE;

a connected mode status of the UE on the first RAT; or a geographic location of the UE.

20. The apparatus of claim 19, wherein adjusting the periodicity is based at least in part on the geographic location of the UE, and wherein the geographic location is determined based at least in part on one or more of a global positioning system location of the UE, a cell global identity of the cell of the first RAT, or a basic service set identifier of a wireless network to which the UE is connected.

21. A method of wireless communication performed by a user equipment (UE), comprising:

performing, while camped on a non-closed access group (CAG) cell of a first radio access technology (RAT), a search for CAG cells of a second RAT different from the first RAT;

populating a database based at least in part on the search, wherein populating the database includes associating the non-CAG cell of the first RAT with one or more of the CAG cells of the second RAT; and performing, while camped on the non-CAG cell of the first RAT and based at least in part on the search for CAG cells and the population of the database, a reselection process from the non-CAG cell of the first RAT to a first CAG cell of the second RAT, of the one or more CAG cells of the second RAT.

22. The method of claim 21, further comprising receiving an indication of a neighbor list indicating neighboring cells to the non-CAG cell of the first RAT available for cell selection, wherein the CAG cells of the second RAT are not included in the neighbor list.

23. The method of claim 21, wherein a quality of the non-CAG cell of the first RAT is above an inter-frequency cell search threshold.

24. The method of claim 21, further comprising delaying the search for a first configured duration.

25. The method of claim 24, further comprising delaying the search for a second configured duration shorter than the first configured duration.

26. A non-transitory computer-readable medium storing a set of instructions for wireless communication, the set of instructions comprising:

one or more instructions that, when executed by one or more processors of a user equipment (UE), cause the UE to:

perform, while camped on a non-closed access group (CAG) cell of a first radio access technology (RAT), a search for CAG cells of a second RAT different from the first RAT;

populate a database based at least in part on the search, wherein populating the database includes associating the non-CAG cell of the first RAT with one or more of the CAG cells of the second RAT; and perform, while camped on the non-CAG cell of the first RAT and based at least in part on the search for CAG cells and the population of the database, a reselection process from the non-CAG cell of the first RAT to a first CAG cell of the second RAT, of the one or more CAG cells of the second RAT.

27. The non-transitory computer-readable medium of claim 26, wherein the one or more instructions further cause the UE to receive an indication of a neighbor list indicating neighboring cells to the non-CAG cell of the first RAT available for cell selection, wherein the CAG cells of the second RAT are not included in the neighbor list.

28. The non-transitory computer-readable medium of claim 26, wherein a quality of the non-CAG cell of the first RAT is above an inter-frequency cell search threshold.

29. An apparatus for wireless communication, comprising:

means for performing, while camped on a non-closed access group (CAG) cell of a first radio access technology (RAT), a search for CAG cells of a second RAT different from the first RAT;

means for populating a database based at least in part on the search, wherein populating the database includes associating the non-CAG cell of the first RAT with one or more of the CAG cells of the second RAT; and means for performing, while camped on the non-CAG cell of the first RAT and based at least in part on the search for CAG cells and the population of the database, a reselection process from the non-CAG cell of the first RAT to a first CAG cell of the second RAT, of the one or more CAG cells of the second RAT.

30. The apparatus of claim 29, further comprising means for receiving an indication of a neighbor list indicating neighboring cells to the non-CAG cell of the first RAT available for cell selection, wherein the CAG cells of the second RAT are not included in the neighbor list.

* * * * *